United States Patent [19]

Gooley

[11] 4,119,860
[45] Oct. 10, 1978

[54] FLUID MEASUREMENT

[76] Inventor: Cornelius Leonard Gooley, 63 Staughton Rd., Glen Iris, Victoria 3146, Australia

[21] Appl. No.: 768,626

[22] Filed: Feb. 14, 1977

Related U.S. Application Data

[63] Continuation-in-part of Ser. No. 647,439, Jan. 8, 1976, abandoned.

[51] Int. Cl.² ............................................. G01N 21/26
[52] U.S. Cl. ................................. 250/577; 73/290 R
[58] Field of Search ............... 250/227, 577; 73/290, 73/293

[56] References Cited

U.S. PATENT DOCUMENTS

| | | | |
|---|---|---|---|
| 2,256,595 | 9/1941 | Metcalf | 250/577 |
| 3,120,125 | 2/1964 | Vasel | 250/577 |
| 3,995,168 | 11/1976 | Neuscheler et al. | 73/293 |
| 3,995,169 | 11/1976 | Oddon | 73/293 |

*Primary Examiner*—David C. Nelms
*Attorney, Agent, or Firm*—Cushman, Darby & Cushman

[57] ABSTRACT

This invention relates to sensing in respect to fluids and utilizes an effect relating to a beam of light and a fluid boundary. It has been found that a beam of light will be modulated differently when submerged and unimmersed in a fluid and also that between these two limit positions critical levels of the beam with respect to the boundary exist in which light transmission is at a maxima and a minima. These maxima and minima can be put to use in liquid level detection and control.

23 Claims, 16 Drawing Figures

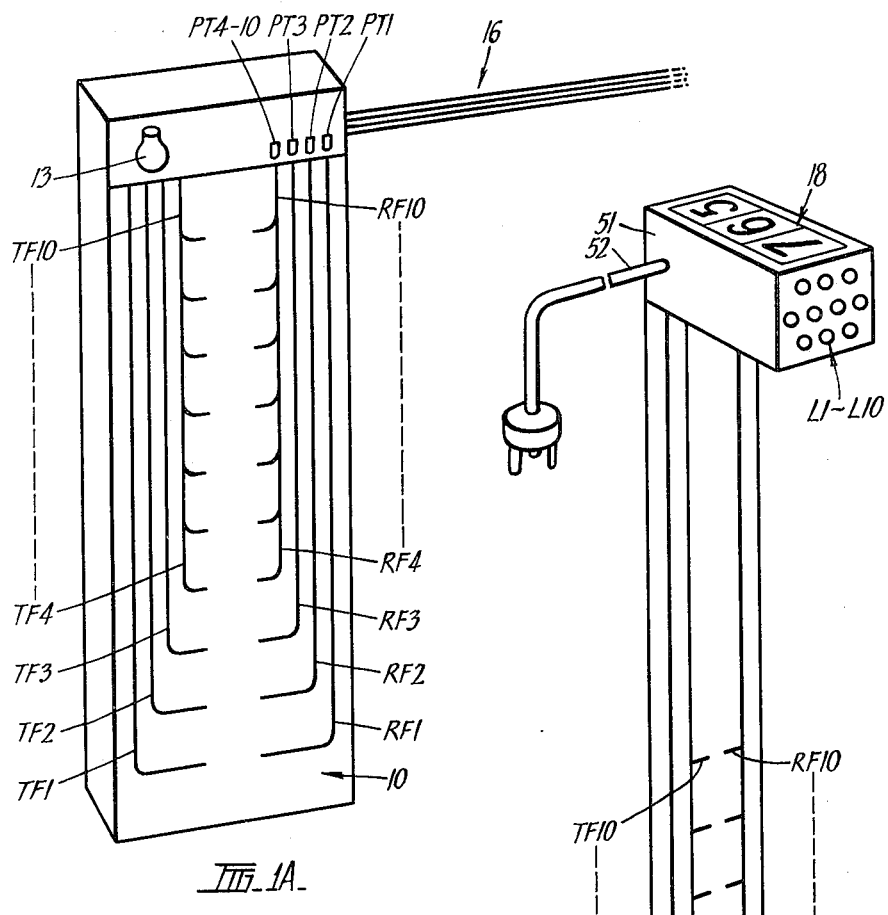
FIG. 1A.
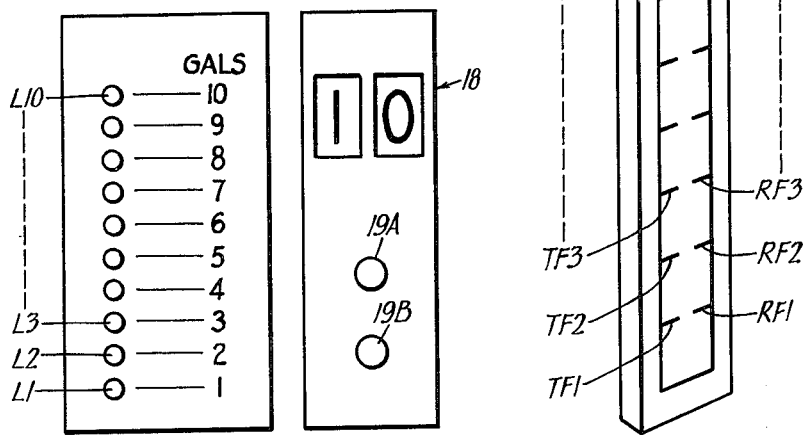
FIG. 1B.
FIG. 2.

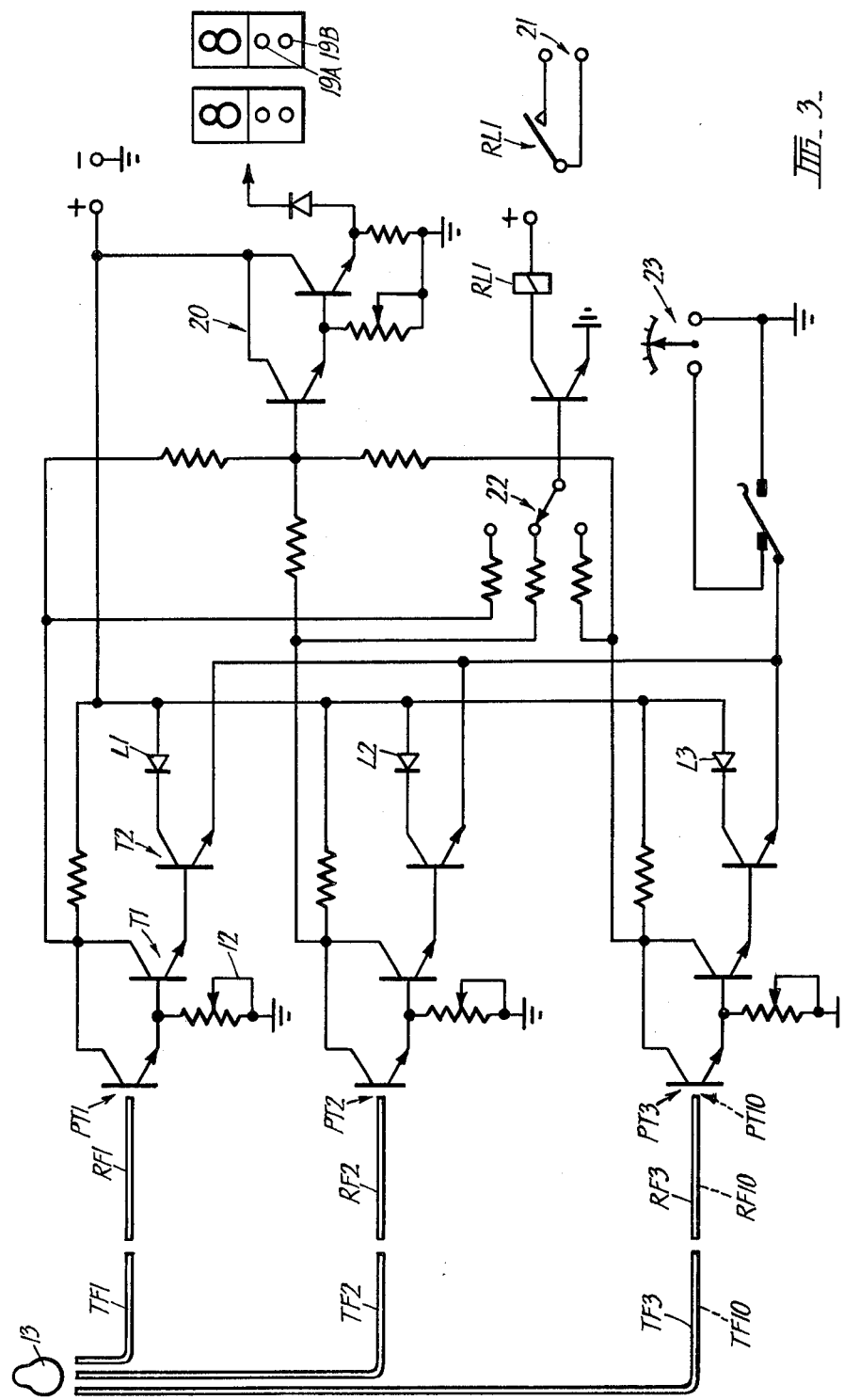

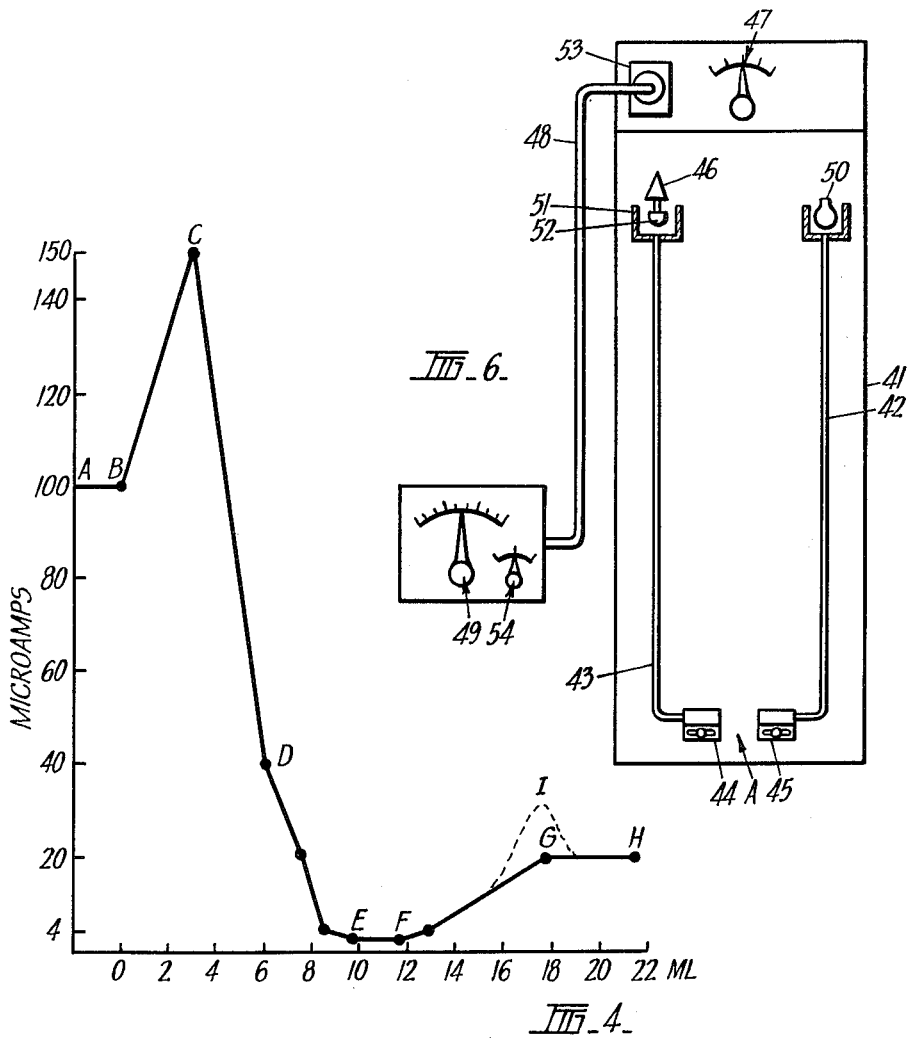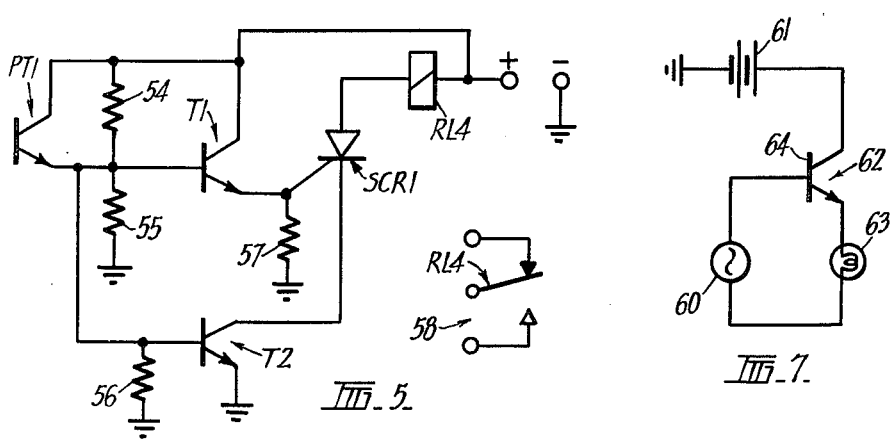

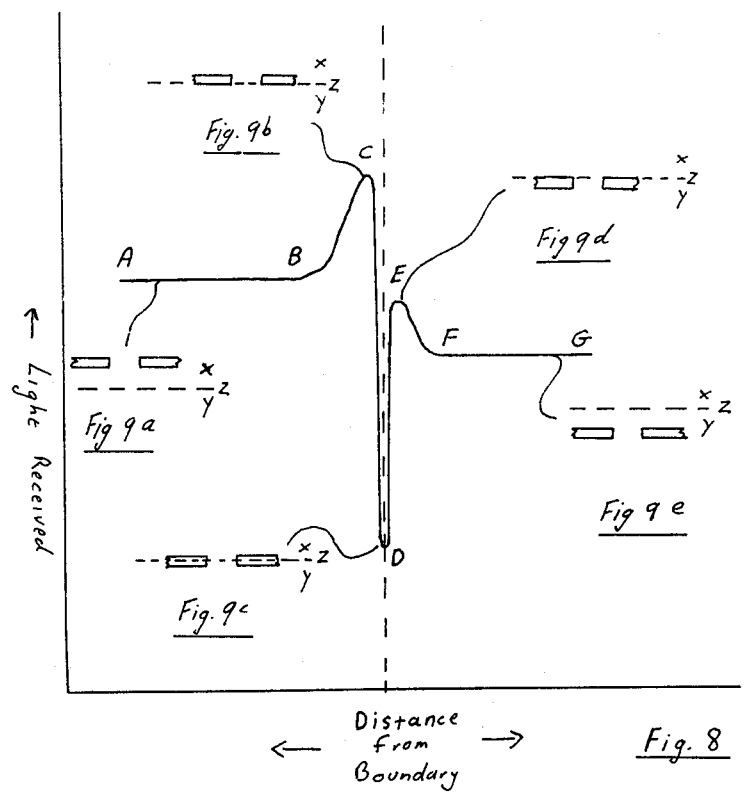
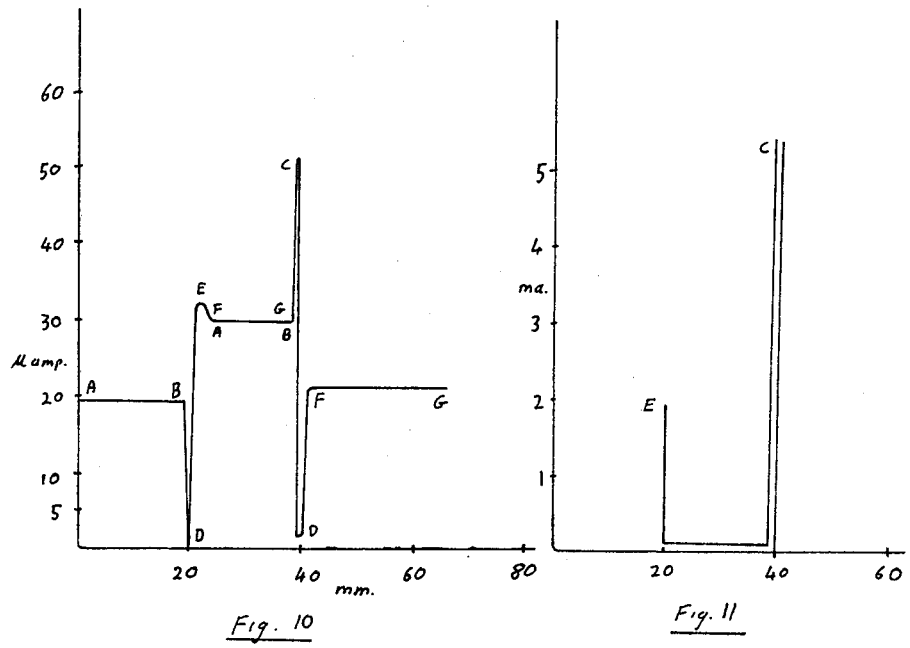

FLUID MEASUREMENT

RELATED APPLICATIONS

This application is a Continuation-in-Part of U.S. application Ser. No. 647,439 filed on Jan. 8, 1976, now abandoned.

BACKGROUND OF THE INVENTION

1. Field of the Invention

This invention relates to measurement of fluids, particularly liquids, and also relates to detecting changes in levels of fluids, particularly liquids. Still further, the invention in one aspect, involves the detection of a particular effect or effects which is believed capable of wide application in manners of manufacture. A further application of the invention provides a means of identification of different fluids and of fluid mixtures, particularly liquids and liquid mixtures.

2. Prior Art

As stated, in one aspect this invention has application to measurement of quantities of liquid. In some instances of measuring quantities of liquid in a tank a float mechanism is provided to indicate when the liquid in the tank is at a certain level, variations in depth of liquid and/or quantity of liquid. In certain examples, the float mechanism is connected to a rheostat and the output of the reheostat is read as current reading on an indicating meter.

In other methods of determining liquid quantities there is used the shunting effect of a conductive liquid across a resistance or probe unit immersed in the liquid but, as the conductivity of some liquids including petrol is low, accurate measurements are complicated and difficult.

One other existing method uses capacitive probes which are usually housed in receptacles at different heights in the liquid tank. These probes are turned to the dielectric constant of the particular liquid and are usually employed to give an alarm when liquid has fallen below a certain level; they are not particularly accurate and are expensive.

This invention has as an object, the provision of means of measuring quantities of liquids, such as petrol or other liquids in automobile fuel tanks or storage vessels. However, the invention also has other objects.

SUMMARY OF THE INVENTION

The present invention provides a method of sensing in respect to a fluid boundary which comprises detecting a maxima or minima, or both, of light transmission occurring between a light transmitter and a light receiver arranged to transmit and receive a beam of light; which maxima and which minima occurring intermediate a portion of the length of the beam of light passing between the transmitter and receiver being to one or the other side of said fluid boundary.

DESCRIPTION OF PREFERRED ASPECTS

The transmitter and receiver are preferably mounted to transmit and receive a beam of light passing generally parallel to the surface of the liquid. At liquid levels intermediate the transmitter being submerged and unimmersed two distinct effects can be obtained; one effect gives a maximum transmission of light received by the receiver and the other effect is a minimum of light received by the receiver. The values of light received by the receiver at these maxima and minima critical levels are distinctly different in value to those values of light received by the receiver when the transmitter and receiver are in the submerged and unimmersed conditions. These maxima and minima levels (hereinafter called maxima and minima critical levels) are very precise and with suitably shaped vessels and electronic circuitry levels detections of the order of one part in ten thousand are obtainable.

Accordingly, this invention also provides a method of detecting a change in the position of a fluid boundary relative to a datum comprising detecting a maxima or a minima, or both, of light transmission occurring between a light transmitter and a light receiver arranged to transmit and receive a beam of light; which maxima and minima occurring at fluid boundary positions intermediate a portion of the length of the beam of light passing between the transmitter and receiver being to one or the other side of said fluid boundary.

The critical levels are usable whether or not the transmitter and receiver are actually within a container and are subject to submersion and in some cases a transparent container may be used with one or preferably both the transmitter and receiver being located outside the container. In this instance, the transmitter and receiver never become submerged but, of course, part of the length of a beam of light passing between them is submerged or unimmersed.

Accordingly, this invention also provides a method of detecting a relative change in the position of a fluid boundary comprising detecting a minima or a maxima, or both, value of light transmission occurring between a light transmitter and a light receiver arranged to transmit and receive a beam of light passing generally parallel to the fluid boundary which maxima and minima values occurring at relative fluid boundary positions intermediate the fluid boundary position being above and below a portion of a beam of light passing between the transmitter and the receiver.

In the methods of the invention it is preferred to also detect the amount of light transmitted when the beam is submerged and unimmersed as these values being different can give two further level readings.

It is preferred that the transmitter and receiver comprise optical fibres as these may be submerged in inflammable liquids whilst at the same time keeping heat such as from a light source and electrical currents such as for a light source and measuring means well away from the liquid.

When optical fibres are used to transmit and receive light in a beam parallel to the surface of the liquid a certain value of light is received by the receiver when the ends of the fibres are submerged, most light is received at the maxima critical level, least light is received at the minima critical level, and a value of light distinct from the aforesaid three level conditions is received when the ends of the fibres are unimmersed; this liquid level is lower in light value that when fibres are submerged. If the fibres are slightly angled downward the light values received at the fibres submerged and unimmersed conditions are interchanged, that is, more light is received in the unimmersed condition than that received at the fibres submerged condition.

As an illustration of the above it is mentioned that a detector current of a value varying with light transmission from the transmitter to the receiver showed an increase from 100 microamps just prior to the maxima critical level being reached (fibres submerged condition) to a maximum of 150 microamps at the maxima critical level. Further with falling liquid level rapid change in detector current occurred to nil zero value which was obtained at the minima critical level. Thereafter in passing to a beam unimmersed condition the detector current rose to 20 microamps.

The above current values were obtained using a wide mouthed 400 m.l. vessel and using a calibrated syringe to extract liquid therefrom. Further, for the change from 100 to 150 microamps, some 3.5 m.l. was removed and this represents 50 microamps per 3.5 m.l. or 14.3 microamps per m.l., with the change in detected current being linear, under the conditions of the experiment, with liquid removal. Since switching circuitry can be easily designed which, under stabilized conditions, can activate on a 0.2 microamp change it can be seen that accuracy of liquid measurement corresponding to one part in 10 thousand can be obtained, and still greater accuracy could be obtained by locating light receivers at different levels.

In going from the maxima critical level to the minima critical level in the same vessel, some 6 m.l. of liquid was removed to produce a change in detected current from 150 microamps to nil zero current. This change was linear between 150 and 40 microamps and this linear section corresponded to 36 microamps per m.l. Thus an accuracy of one part in ten thousand is easily obtainable.

The maxima and minima critical levels can be detected when the light receiver is aligned to receive a beam of light in a horizontal plane and with transmission of light watts means of an overhead light such as a flood light but as a light source of 100 wats in close proimity to the surface was necessary to obtain readings having a sufficient accuracy and as variations of 10 percent were encountered it is believed to be better that the beam of light should pass generally parellel to the surface of the liquid and should originate from a light transmitter oriented to transmit primarily generally parallel to the surface of the liquid. Thus, using horizontally aligned transmitting and receiving optical fibres a lamp of 2.5 watts was sufficient.

The spacings of the fibre ends are preferably adjustable to give suitable sensitivities with various liquids; a preferred arrangement gave spacings of 2-10 mm.

The same characteristics as the optical fibre arrangement can be obtained when using light emitting diodes (LED) in close proximity to photo-detectors. Both detector and LED can be encased in small glass or plastic housings, which can be similar to screw based torch globes and portable applications may be better served in some cases using this arrangement instead of optical fibres or light transmitting rods extending from inside a liquid container to outside transmitting and receiving apparatus. Connecting wires will usually connect the LEDs and photo-detectors to the outside electronic apparatus and wiring can be more flexible than optical fibres. However, electrical currents could be flowing in fluid covered wires connecting the LEDs; in contrast with optical fibres, or glass or plastic rods, only light is transmitted through the liquid and this is an advantage in respect of dangerous fluids. When optical fibres are used the ends of the fibres submerged in the liquid are preferably sealed against fluid entry either by plastic sealing or enclosing and sealing the fibre ends in glass capsules.

One other object of this invention is to provide a means for liquid identification and this is enabled as different values of detected current, at the fibres submerged condition, the maxima critical level and the minima critical level, were obtained when different liquids and liquid mixtures were interchanged in a measuring vessel and light transmissions were measured.

Accordingly this invention provides a method of detecting different liquids and liquid mixtures when the light transmission between a light transmitter and a light receiver is varied as a consequence of passing through liquids which liquids may be composed of a number of liquids or solutions.

This variation of light transmission through different liquids occurs at the maxima critical level and at the minima critical level and at the fibres unimmersed or light beam submerged position.

As an illustration it is stated that a detected current of a value of 2 milliamps was recorded by the light receiver when the light beam from the transmitter was passed through petrol. When the liquid was changed to kerosene, the identically submerged beam of light caused the detected current to raise to 8 milliamps. Changing the liquid to water and measuring under the aforesaid conditions gave a detected current reading of one microamp. At the maxima critical level, petrol gave a detected current reading of 10 milliamps, kerosene at the maxima critical level gave a detected current reading of 15 milliamps and water at the maxima critical level gave a detected current reading of three microamps. At the minima critical levels in this test, petrol, kerosene and water registered zero detected current.

Further tests after amplification of the D.C. amplifier used was raised gave detected current for water at the maxima critical level as 15 milliamps, and 4 milliamps at the fibres submerged level. Using the same amplification setting, wood alcohol gave a reading of 20 milliamps at the maxima critical level and 15 milliamps at the fibres submerged condition.

Adjusting the amplification to give a reading in detected current of 15 milliamps when at the fibres submerged condition in kerosene the following current readings were obtained, using this same amount of D.C. amplification:

Kerosene at the fibres submerged condition = 15 milliamps

Petrol at the fibres submerged condition = 10 milliamps

Wood alcohol at the fibres submerged condition = 20 microamps

Water at the fibres submerged condition = nil reading kerosene at the maxima critical level = 40 milliamps Petrol at the maxima critical level = 26 milliamps Wood alcohol at the maxima critical level = 50 microamps Water at the maxima critical level = nil reading When certain liquids are mixed with other liquids or soluble solutions, there is a change in light transmission through the liquid mixtures as a consequence of this mixing. If the mixing is not homogeneous the identification of each separate liquid in the mixture can be obtained. In a kerosene and water mixture there is clearly two separate liquids contained in the liquid mixture; kerosene can be seen floating on top of the water. Lowering a probe type unit which contained a light transmitting and receiving fibre into the water and kerosene mixture the following detected current readings were obtained. With the probe unit placed in the liquid container so that the fibre sensors were at the maxima critical level for kerosene, the current reading was 17 milliamps, at the fibres submerged in kerosene the current reading was 10 milliamps. Lowering the probe unit further into the liquid until the junction of the two liquids was reached the current value at this liquid junction gave zero reading. Lowering the probe still further until the fibres were submerged in water also gave zero current reading. However adjusting the gain of a D.C. amplifier of the probe unit so that at the fibres immersed in kerosene condition a current reading of 80 milliamps originated, when the probe unit was lowered to the fibres submerged in water condition the current reading was 4 microamps. At the junction of the two liquids the current reading was zero. Using a petrol and water mixture the maxima critical level for petrol gave detected current reading of 18 milliamps, at fibres submerged in petrol the reading was 12 milliamps, at the petrol water interface the current reading was zero. In the fibres submerged in water position the reading was 4 microamps. Adjusting the gain of the probe unit to give 40 milliamps when the fibres were submerged in petrol, when the fibres of the probe unit were at the submerged in water condition the current reading was 4 milliamps, at the exact liquid junction the current reading was zero. Just prior to this exact junction position of the two liquids a pulse reading of 6 milliamps was detected. This 6 milliamps reading corresponded to the maxima critical level for water whilst the zero reading at the liquids interface corresponded to the minima critical level condition for the petrol liquid; the amount of liquid between these last two readings was of minute proportions. It can be seen from the above that the probe unit specifically detected two different liquids in mixture and gave the maxima and minima critical level for each liquid as well as the different fibres submerged current readings for each liquid. It is of note that the exact interface of the two different liquids was clearly defined.

In another test the probe unit was adjusted in gain so that wood alcohol gave a reading of 17 milliamps at the maxima critical level and 10 milliamps at the fibres immersed condition in the wood alcohol. When a small percentage of water was added to the wiid alcohol the maxima critical level reading dropped to 16 milliamps and the fibres submerged current reading was zero current; further addition of water gave a maxima critical level reading of 5 milliamps and zero current at the fibres immersed condition. A 50 percent mixture of kerosene and petrol gave current readings intermediate between the separate current readings for petrol and kerosene.

The probe unit as mentioned may be of small dimensions so as to be a hand held device suitable for determining different liquids or liquids in mixture in small quantities such as those encountered in the home or factory.

The above methods have been used and are suggested for use in applications such as milk analysis for butter fat and water content, identification of different wines and the determination of their alcohol content, detergents, medical anc chemical preparations, dangerous liquids in households and the like, the solubility of chemical preparations, homogeneous liquid mixtures, vegetable oils and such like.

Building the probe unit into a dipstick instrument enables large liquid storages to be analysed; one immediate application is the determination of the amount of water contained in fuel storage tanks. In this, the dipstick is provided with suitable continuous depth markings engraved on the body of the dipstick. When lowered into the fuel storage tank it will indicate how much fuel is in the tank and how much water or other liquid is also contained therein.

This invention is also capable of measuring the moisture content of vapours. If such a vapour is passed between a transmitter and receiver the detected current varies in the measuring instrument in proportion to the amount of moisture contained within the vapour. In one application the fibre sensors were contained in a distance piece inserted between the carburettor and manifold intake of a combustion engine and enabled the petrol air mixture to be evaluated.

This invention also provides apparatus capable of performing the methods of the invention.

The present invention has application in fuel gauges for petrol tanks, carburettor float bowl level maintenance, dipsticks, list determination and control in ships, identification of liquids, control and monitoring of large liquid installations, and many other uses. Some specific uses of the invention will now be given but these are not to be considered to be limiting on the invention.

BRIEF DESCRIPTION OF THE VIEWS OF THE DRAWINGS

FIG. 1A is a schematic perspective view of a transmitter unit for locating in part of a fuel tank, FIG. 1B is a schematic elevation of an indicator unit to be activated by the transmitter unit of FIG. 1A, FIG. 2 is a schematic perspective view of a transmitter unit similar to FIG. 1A but for use as a dipstick and also including an indicator unit similar to FIG. 1B, FIG. 3 is a schematic drawing of circuitry of the transmitter and indicator units of FIGS. 1A and 1B, FIG. 4 is a graph of detected current versus liquid levels, FIG. 5 is a schematic circuit for obtaining a pulse and steady current for a definite amount of liquid extraction, FIG. 6 is a schematic perspective of a hand held probe unit, and FIG. 7 shows an alternative circuit for using a pulsed light source in lieu of a D.C. light source.

FIG. 8 is a schematic graphical representation of results obtainable by certain methods in accordance with this invention, FIGS. 9a-e are schematic representations of fibers and fluid-fluid boundaries.

FIGS. 10 and 11 are graphical representations of the results of Table I.

Referring now to FIG. 1A, the transmitter unit shown comprises a body 10, which, in use, is mounted in a fuel tank. The body supports light transmitting optical fibres TF1-TF10 which, at one ends, terminate adjacent a lamp 13 and at various different levels of the body 10 (corresponding to, say, the gallonage levels of the fuel tank) at the other ends. The body also supports light receiving optical fibres RF1-RF10 which, at one ends, are aligned with respective said other ends of the transmitting fibres and each of which terminates adjacent a respective photo-responsive device PT1-PT10 at their other ends.

A plug-in cable 16 carries signals from the devices PT1-PT10 to the indicator unit shown in FIG. 1B. It will be observed that the lamp 13 and devices PT1-PT10 need not be located in the fuel tank and thus electrical currents can be kept away from hazardous vapours. The indicator unit shown in FIG. 1B comprises a series of lamps L1-L10 which by lighting can indicate the number of gallones of liquid in the fuel tank and also a digital counter 18 which can similarly indicate the number of gallons in the fuel tank and by means of the reset and step buttons 19A and 19B give an indication of the amount of fuel added or removed from the tank. The indicator unit contains circuitry which, together with the lamp 13, fibres TF1-TF10 and RF1-RF10 and photo-responsive devices PT1-PT10, is shown in FIG. 3.

In FIG. 3 the devices PT are photo transistors indicated in the drawing by PT followed by a number corresponding to the transmitting and receiving fibres TF1-TF10 and RF1-RF10 which it represents. In this instance 10 transmitting and receiving fibres are used but for simplicity only PT1-PT3 are shown; PT4-PT10 having been omitted for ease in drawing. Similarly, circuit elements to co-operate with PT4-PT10 have been omitted. In FIG. 3 the lamps L are light emitting diodes indicated by L followed by a number corresponding to the transmitting and receiving fibres TF1-TF10 and RF1-RF10; as before, lamps L4-L10 have been omitted for clarity.

The following is a description of the electronic apparatus associated with each of the receiving fibres RF1-RF10. The collector of each of the photo-transistors PT1-PT10 connects into the base circuit of a transistor d.c. amplifier. This amplifier may be two transistors (T1 and T2 for PT1) such as B.C. 108 or similar types connected in a darlington circuit configuration. The final switching transistor can have in its collector a visual indicator such as a light emitting diode (LED) (L1 for PT1). With an adjustable d.c. biassing such as that obtained by a screw driver set potentiometer 12 in the base current of the final switching transistor T2 or the driving transistor T1 (as shown) the final switching transistor T2 can be biased and adjustment dependent on fibre spacing can be had so that transistor T2 will only activate when conduction equivalent to 100 microamps or greater (maxima critical level and optical fibres covered with liquid) is originated from the photo-transistor PT1. When the final switching transistor is so activated the LED in the collector circuit will light and remain steady (at fibres covered condition) thus a means has been provided whereby, when the optical fibres in the tank are covered with liquid, a visual signal is obtained. When the equivalent conduction of the phototransistor drops to, say, 20 microamps, the switching transistor deactivates and the visual signal is extinguished. This means that when the fibres are clear of liquid no visual signal is given.

When the liquid level is at the maxima critical level or the minima critical level the photo-transistor PT1 experiences very markedly the maximum and minimum conduction condition. Since these critical levels manifest themselves very briefly when the liquid is in motion, the sudden occurrence of either of these two critical levels will originate a voltage pulse at the output of T1 and T2. These pulses due to the critical level appearances can be extracted by use of suitable circuitry indicated by 20 and applied to a numeric display unit such as the digital counter 18. In one embodiment of the invention the maxima critical level pulses were fed into a pocket electronic calculator, which calculator could be set in the automatic summing mode, each pulse from the apparatus advanced the digital read out by one unit. Output facilities are provided on some counters of the digital readout type to interconnect a number of these display units so that a large number of pulses can be counted and provision is also made for logic outputs to operated remote slave units. Also provided is a facility for clearing all registers by means of the reset button 19A. It can be seen that, if two optical fibres are so placed on a suitable mounting in a tank of known dimensions and when the liquid reaches a critical level (a choice is available of maxima or minima), the digital counter 18 will operate and count this event; when the liquid passes this critical level a visual signal will light by means of one of L1-L10 and indicate that the liquid has passed this certain measuring point. Further when the liquid has dropped from the fibres covered condition to the critical level (which may be maxima or minima) in the case of the minima level the visual signal given by L1-L10 will extinguish and the counter 18 will operate and count this position, thereby counting fuel used.

By the use of a plurality of the transmitting and receiving fibres at different levels it is possible to obtain accurate information as to how much fuel is added to the tank or has been used. As an example of how the transmitter and indicator units of FIGS. 1A and 1B may be used, the following is given.

Assuming the fuel tank is near empty, a vehicle fitted with the transmitter and indicator unit is driven to a filling station and a request made for, say, 8 gallons of fuel. In the filling 8 critical level pulses will be received and the digital counter 18 will record these. If desired an audible signal can be given by the device identified by 21 via relay RL1 when, say, 8 gallons has been delivered after selecting, say, "eight" means of the switching means identified by 22. An audible source of sound can also be switched on when only a predetermined amount of fuel remains in the tank. As well as the digital counter 18 counting the 8 gallons the LEDs will light (L1-L8). By the use of the reset and step buttons 19A and 19B the digital counter 18 can be used to also indicate the amount of fuel used.

The dipstick shown in FIG. 2 is similar to the transmitter and indicator units shown in FIGS. 1A and 1B and like numerals denote like parts. In this instance power for the dipstick is provided by batteries in the housing 51. The dipstick is provided with a remote control mechanism cable 52. The circuit for the dipstick is similar to that shown in FIG. 3. In addition there is a switch mechanism and rely which can operate a remote stop/start, for instance, control for a pump, via cable 52.

In alternative circuitry the emitter currents of the final switching transistors in the d.c. amplifiers are passed to a summing meter. As an example of this, suppose each emitter produced 10 milliamps, then when 10 emitters were emitting (corresponding to 10 pairs of fibres being covered, i.e. 10 gallons of fuel) a reading of one hundred milliamps would be obtained on a meter such as a summing meter 23 in FIG. 3.

FIG. 4 is a graph of current and liquid level. The graph shown in FIG. 4 illustrates a current produced by a photo-detector which received light from a receiving optical fibre which in turn received a beam of light from a transmitting optical fibre. The fibres were disposed horizontally, the region A-B on the graph illustrates the current detected when the fibres were submerged. The region B-C illustrates the current detected in passing from the submerged condition to the maxima critical level; "C" represents the maxima critical level. The region C-D illustrates an approximately linear relation of current to liquid removed. The region C-E illustrates the current detected in passing from the maxima critical level to the minima critical level; E-F represents the minima critical level. The region F-G illustrates the current detected in passing from the minima critical level to a fibres unimmersed condition and the region G-H illustrates the current detected when the fibres were unimmersed.

FIG. 5 shows a simple counting or control circuit which can activate at the maxima critical level and maintain activation over a selected range of liquid withdrawal or supply. In that circuit PT1 is a photo-transistor as outlined in previous explanations. T1 is a d.c. amplifying transistor which is biased to operate on 150 microamps of current from PT1. T2 is a second transistor and is biased to operate at 140 microamps of detected current from PT1. Resistors shown as 54, 55 and 56 provide the biassing points for T1 and T2. The emitter of T1 is returned to negative via resistor 57. The gating lead of silicon controlled rectifier SCR1 is joined to the junction of T1 emitter and resistor 57. Relay RL4 is connected between the anode of SCR1 and positive power; the negative side of the power supply is grounded. The cathode of SCR1 is connected to the collector of transistor T2; the emitter of T2 is grounded. The contacts of relay RL4 shown as 58 are used to provide counting or control functions to required apparatus. The action of the circuit is as follows.

When PT1 is activated to 150 microamps of detected current at the maxima critical level, T1 transistor which has its base held biassed by resistors 54 and 55 and emitter resistor 57 is switched into conduction. This causes a voltage pulse to originate across emitter resistance 57. This voltage pulse is applied to the gate of SCR1. This causes SCR1 to conduct. When SCR1 conducts relay RL4 operates via SCR1 and transistor T2 which is connected between the cathode of SCR1 and ground T2 has its base biassed by resistors 54, 55 and 56 and those resistors are selected in value to provide a biassing-off voltage for transistors T1 and T2. In the case of T1 the bias is only exceeded when 150 microamps of detected current is received at PT1. In the case of T2 the cut-off bias is exceeded when 140 microamps of detected current is received so that when T1 conducts and triggers SCR1 the base of T2 is already in the conducting mode; snce 140 microamps has been exceeded. When SCR1 is conducting it allows positive voltage via the relay and its anode circuit to be connected to the collector of T2 so that T2 immediately conducts and provides a holding circuit for SCR1 and relay RL4. When the detected current drops below 140 microamps, transistor T2 is cut off, this causes SCR1 and relay RL4 to release and thus a counting or control circuit function has been arranged to occur over the 10 microamp detected current variation between 150 and 140 microamp.

From the graph in FIG. 4 this 10 microamp variation means that only 0.25 cubic centimeters of liquid in a 400 cubic centimeter vessel is needed to operate and release the counting or control apparatus and thus this method of functional control can be used to extract or add a given amount of liquid to the container. The peak (maxima) of the pulse can be the exact measure point or the trough (minima) of the pulse can be chosen.

FIG. 6 illustrates the aforementioned probe unit used in liquid identification. The body 41 of the probe unit is of plastic or metal material, the transmitting optical fibre 42 is excited by lamp 50 the receiving optical fibre 43 and the transmitting fibre are separated by air gap "A" at the liquid sensing end of the probe unit. This air gap is adjustable by means of adjustable mounting 44 and 45; which mountings also provide housings for the sensing ends of the optical fibers. The receiving fibre 43 terminates in upper housing 51 and abuts against the sensitive face area of photo-detector 52. The detector output drives d.c. amplifier 46 and a gain control 47 of the amplifier provides adjustment to vary the effect of output detected current which is received as a result of light transmission from the sending fibre across the air gap "A" to the receiving fibre when the fibre ends are submerged and unimmersed in liquid. The gain control 47 adjusts the sensitivity of the apparatus. The resultant current of the probe unit is read on an indicating meter apparatus 49; a range switch 54 allows the indicating meter to read in microamps of milliamps. The indicating meter apparatus is attached by a flexible lead 48 to the probe unit and can be plugged and unplugged into socket 53 of probe unit. The adjustable fibre ends mountings 4 and 5 of the probe unit allow the optimum gap spacing for a particular liquid to be selected as locking the mountings at a selected spacing enhances the ability of the probe unit to differentiate between liquids. To illustrate this point it was found that at a certain amplification setting of the d.c. amplifier the optimum gap for kerosene was 10 millimeters whilst the spacing for water was 6 mm. Measuring water with a 10 mm. spacing after the probe unit had been adjusted to maximum indication for kerosene resulted in a very marked difference in detected current readings enabling the detection of different liquids to be easily seen.

A further method of liquid identification is to use two of these probe units which units have been set to give identical readings for a particular fluid or fluid mixture. The outputs of the probe units are taken to a difference amplifier which simultaneously amplifies separate channel inputs; if the magnitude of the two separate inputs are identical the amplifier produces no output but if one of the inputs is different in value to that of the other the amplifier will amplify the difference and produce an output.

Placing one of the probe units in a known liquid and placing the second probe unit in the liquid to be identified will indicate when the two liquids are identical by use of the difference amplifier.

Certain liquids under the influence of light accumulate over a period a build up of light conduction. To circumvent errors which may thus occur when measuring liquids and differentiating between different liquids, the light source energising the transmitting fibre may be pulsed.

Under special circumstances caused by high temperatures some photo-responsive devices may emit leakage currents as a result of these high temperatures. It is possible that these leakage currents may reduce the sensitivity of the d.c. apparatus used in the invention when measuring at low light levels. Thus a pulsed source of light allow the photo-responsive device to pass this pulsed light signal to an a.c. mode and then rectified back to d.c. to actuate the signal and measuring apparatus previously described. This method reduces the possibility of d.c. leakage currents from the photodetector caused by high temperature interfering with the measuring apparatus.

One simple apparatus for pulsing is shown in FIG. 7 where a d.c. power source such as a battery 61 is used as a source of power for switching transistor 62. In series with transistor and the return side of the battery is placed a light globe 63. The base of the transistor has a variable frequency generator 60 connected between it and the return side of the battery; thus the switching rate of the transistor is varied by the frequency generator. Hence the light transmitted through the liquid is pulsed at the selected rate. The light source may also be conveniently a light emitting diode; which by reason of the pulsed source of excitation can produce greater intensities of light output without damage to the diode. Further extension along these lines allows laser beams to be used as a light source; this is more applicable when the measuring apparatus is located some distance from the measured liquid, for example water reservoirs and oil refineries. In the normal applications it will be convenient to power the light source from batteries or from the a.c. mains.

The use of current meters to indicate the amount of detected current resulting from light beam analysis can establish figures of merit for different liquids, solutions or combinations thereof. Another means of obtaining a figure of merit is to sample the resultant detected current over a period of time similar to the ramp detection action of digital voltmeters; the figure of merit is then read out on a digital display.

In some large installations identifying fibres may be placed in pipe lines so that when liquids other than the required liquids are being pumped, due to accidental operation of control valves etc., corrective action may be originated by the sensing fibres.

Since the fibre sensors will simultaneously identify liquids and sense liquid level variations or read liquid quantity, apparatus can be constructed to read out and monitor (in one application) both fuel and water contained in fuel tanks. Control functions extended to pumping machinery can be designed to differentiate between fuel and water. Large installations with built-up measuring fibres as mentioned previously can be designed to differentiate when liquids other than the normal stored liquid is present.

Following from the above, further investigations were conducted using the apparatus of FIG. 6 and in one experiment, which was a repeat of that which produced FIG. 4, a second maxima effect indicated by dash line and I in FIG. 4 was detected.

Further investigations were conducted and from these it has been shown that maxima and minima effects can usually be detected in the region of fluid-fluid boundaries and that these effects are probably, in the case of the maxima, a consequence or reflections at the boundary.

Still further, by appropriate choice of apparatus and with care in taking readings it has been found that one maxima on each side of a boundary can usually be detected; i.e., two maxima can be detected in respect of each boundary and this tends to support the view that maxima are a product of reflections. It should, however, be noted that where a boundary has fluids on opposite side thereof of widely different character one or other of the maxima may be difficult to detect or that in adjusting apparatus, after the detection of one maxima, for the purpose of detecting a minima, the other maxima may be masked.

Thus, in the case of FIG. 4, the maxima occurring at I appears to have been masked in early experiments firstly by adjustment of amplifier gain to detect the minima at E and secondly because a current meter having a dumped movement was used and the maxima occurring at I had been passed through before the meter had overcome the dumping.

The above and further experimental results will be illustrated with reference to additional drawings.

Referring to FIG. 8, this schematically graphically represents the two maxima conditions obtainable as well as the minima condition. In this respect, the graph represents a boundary (Z) between two fluids (X and Y) moving relative to a beam of light passing between the transmitting and receiving optical fibres of the apparatus of FIG. 6. The region A-B of the graph represents a measure of the light received by the receiving fibre when in fluid X and remote from the boundary. This condition is indicated schematically in FIG. 9a where the fibres are indicated as 42 and 43 and the boundary is indicated as Z.

As the fibres approach the boundary Z a maxima effect at C is detected. This maxima is detected substantially at contact of the fibres with the boundary Z and is illustrated in FIG. 9b.

When the fibres are at the boundary Z a minima effect at D is detected. This is illustrated in FIG. 9c.

As the fibres leave the boundary Z a second maxima effect at E is detected. This maxima is detected substantially at the fibres leaving contact with the boundary Z and is illustrated in FIG. 9d.

The region of the graph F-G represents a measure of the light received by the receiving fibre when in fluid Y and remote from the boundary. This condition is indicated schematically in FIG. 9e.

Thus, it is seen that two maxima and one minima can be obtained but in practice it may be difficult to detect both maxima and, further, so detecting will rarely be necessary. For instance, with a view to detecting a boundary between water and petrol the FIG. 6 apparatus was used and a maxima in passing from petrol to the boundary was not detected when the amplification was adjusted to detect the light received in water as well as in petrol. However, if the amplification was reduced in gain it became possible to obtain readings of 100 microamps when the fibres were submerged in petrol and 40 milliamp as a maxima in passing from petrol to the boundary.

In a further experiment, the apparatus of FIG. 6 was lowered into a container containing immiscible liquids P and Q and above which was air which is referenced R. The fibres 42 and 43 of the FIG. 6 apparatus were lowered from a position 20 mm above the air-liquid P boundary (R-P), through that boundary, through liquid P which was 20 mm deep, through the boundary P-Q and through liquid Q which was 20 mm deep.

Readings were taken of the current output of phototransistor 52 with and without amplification. Results were as follows in Table I.

TABLE I

| Fibre spacing Readings | (i) 10 mm | (ii) 10 mm | (iii) 5 mm |
| --- | --- | --- | --- |
| In Air (R) | 18 microa. | 0 | 0 |
| Minima at boundary R-P | 0 | 0 | 0 |
| Maxima in P adjacent boundary R-P | 32 microa. | 2 millia. | 3 millia. |
| Submerged in liquid P | 30 microa. | 30 microa. | 2 millia. |
| Maxima in P adjacent boundary P-Q | 5 microa. | 0 | 0 |
| Minima at boundary P-Q | 5 microa. | 0 | 0 |
| Submerged in liquid Q | 22 microa. | 0 | 2 microa. |

((i) Photo cell output readings without amplification,
(ii) Photo cell output amplified by triggering to give unit gain at 30 microamp input). The results are graphed in FIGS. 10 and 11.

The above was repeated with the gain of the amplifier adjusted to give a reading when the fibres were in air. The results are shown in Table II.

TABLE II

| Fibre spacing | 10 mm |
|---|---|
| In Air | 1 microamp |
| Minima at boundary R-P | 0 |
| Minima at boundary P-Q | 0 |
| All other reading 20 milliamps (maximum current). | |

From Tables I and II above, it will be seen that under certain amplification certain readins became undetectable and that under the conditions one maxima in respect of each boundary was not detected. However, this last had no significant effect in determining the position of the boundaries which were sufficiently identified from the readings obtained.

It can also be seen that the 5 mm spacing of fibre ends made the maxima less pronounced. This is postulated to be a result of a shortened reflective path as compared to the 10 mm spacing and a relatively large amount of light being received in a direct path.

To illustrate effects which are believed to be consequent on reflections a light source was arranged to project a beam at 20° and 10° to the plane of the boundaries. The only detection obtained at 20° was an amplified reading of 20 milliamps (all other reading being nil); a maxima corresponding to the detector fibre being in liquid P and adjacent the boundary P-Q.

At the 10° angle amlified readings of 10 microamp and 20 milliamp corresponding to maxima in liquid P and respectively adjacent the boundaries R-P and P-Q.

It is believed that the greater maxima in liquid P adjacent the boundary P-Q as compared to that adjacent the boundary R-P is due to the dense media producing greater reflections.

As stated, FIGS. 10 and 11 are a graphical representation of the results shown in Table I and for ease of comparison with FIGS. 8 and 9a-e similar reference letters as in FIG. 8 are used.

From the above and from other experimental evidence it is believed possible to give general guidance as to the obtaining of maxima and minima critical level effects.

The use of optical fibres is very desirable but other transmitters and receivers can be used. However, if the receiver has a receiving diameter of greater than one-sixteenth of an inch, the maxima and minima effects may not be easy to detect or may be missed altogether. This is not to say that with suitable amplification and detection instruments maxima and minima cannot be detected when receiving diameter exceeds one-sixteenth of an inch, however, applicant believes that with greater diameters a significant proportion of the receiving cross-sectional area will receive light directly from the transmitter and that secondary light paths arising from reflections will represent a lesser proportion of the light received by the receiver. Thus, maxima and minima effects will be less pronounced and results obtained will tend to an average.

Thus, a diameter of the receiver of one-sixteenth of an inch is considered a practical upper limit. This is equivalent to a cross-sectional area of 0.098 inch. Where light guides comprised of a plurality of individual fibres are used, this dimension may, perhaps, have been exceeded because of the limited receiving acceptance angle of each individual fibre as compared to, say, a one-sixteenth of an inch diameter glass rod.

It is believed that the above criteria are most important in obtaining satisfactory results. Effects which are believed to be of lesser significance are stated below.

As stated above, the receiving acceptance angle has an effect but, presuming reflection is the cause of the maxima effect, a receiving acceptance angle of 0° would be undesirable. However, such a receiving acceptance angle is not likely in practice and thus the use of optical fibres is preferred.

In general light guides of up to one-sixteenth of an inch diameter and containing not less than 100, preferably 400 and most preferably at least 600 fibres have given best results. The individual fibres of these light guides are generally $2.0 \times 10^{-3}$ inch or less in diameter and, apart from matters of cost, it may be said that the smaller the better.

Similarly, the cross-sectional area of the light transmitter has a similar effect to, but is less significant than, the receiver.

The spacing of the transmitter and receiver is preferably from 2-10 mm as stated previously. If 10 mm spacings are exceeded the readings all tend to be lower and closer to an average. If spacing is less than 2 mm, the maxima effects are less pronounced and the minima tends to be closer to an average. A lower limit of 5 mm is generally preferred although absorption of light may make a lower spacing desirable.

Amplification of currents obtained can, be stated above, be helpful but, also as stated above, can mask effects. Thus, variability of gain is desirable and, clearly, the use of logic circuits to cause different gains to apply at different times would be desirable. The use or lack of use of amplification is not of itself critical provided that the detection equipment is otherwise sufficiently sensitive.

The nature of the fluids under investigation and their nature relative to one another has an effect and in this respect maxima and minima which occur at liquid-liquid boundaries are most easily detected.

Many applications of the above invention are possible as it enables measuring detection and control and purely as an example it is mentioned that all liquids in a motor vehicle can be measured and monitored for quantity and quality and control or advice thereon may be generated.

I claim:

1. A method of sensing with respect to a fluid boundary which comprises the steps of:
   transmitting light from a constant source;
   receiving light transmitted from said source;
   producing an electrical signal related to the intensity of said received light; and
   detecting at least one extremum in said signal, said at least one extremum occurring when said fluid boundary is positioned proximate the beam of light received in said receiving step.

2. A method as claimed in claim 1, wherein said receiving step receives light in a generally horizontal plane.

3. A method as claimed in claim 2, wherein at least one of said light transmitting and receiving steps transmits or receives light passing in a direction having components in horizontal and vertical planes.

4. A method as claimed in claim 2, wherein said detecting step comprises the step of translating said signal into an indication of fluid level.

5. A method as claimed in claim 1, wherein said detecting step comprises the step of translating said signal in order to differentiate said signals produced by different fluids.

6. A method as claimed in claim 1, wherein said receiving step receives light in a cross-sectional area of 0.1 inch or less.

7. A method as claimed in claim 1, wherein said receiving step receives light incident on a plurality of optical fibres.

8. Apparatus for sensing with respect to a fluid boundary comprising:
   means for receiving light;
   means, responsive to said receiving means, for producing an electrical signal related to the intensity of the received light; and
   means for detecting at least one extremum in said signal occurring when said fluid boundary is positioned proximate the beam of light received by said receiving means.

9. Apparatus as claimed in claim 8, further comprising a light transmitter adapted to direct a beam of light for receipt by said receiving means.

10. Apparatus as claimed in claim 8, wherein said receiving means is arranged to receive light in a generally horizontal plane.

11. Apparatus as claimed in claim 9, wherein one of said transmitter and receiving means is arranged to transmit or receive light passing in a direction having components in horizontal and vertical planes.

12. Apparatus as claimed in claim 9, wherein said transmitter and receiving means are arranged to transmit and receive a beam of light in a generally horizontal plane.

13. Apparatus as claimed in claim 9, wherein said transmitter comprises a plurality of optical fibres.

14. Apparatus as claimed in claim 9, wherein said receiving means has a receiving cross-sectional area of 0.1 inch or less.

15. Apparatus as claimed in claim 9, wherein said transmitter includes a light emitting diode.

16. Apparatus as claimed in claim 8, wherein said receiving means comprises a plurality of optical fibres.

17. Apparatus as claimed in claim 9, comprising a plurality of transmitters and receivers disposed at different levels.

18. Apparatus as claimed in claim 9, wherein said transmitter is operative to transmit pulses of light.

19. A method of sensing with respect to a fluid boundary which comprises the steps of:
   transmitting light from a constant source;
   receiving light transmitted from said source;
   producing an electrical signal related to the intensity of said received light;
   detecting a maxima in said signal, said maxima occurring when said fluid boundary is positioned proximate the beam of light received in said receiving step.

20. A method of detecting a change in the position of a fluid boundary relative to a given position comprising the steps of:
   transmitting light from a constant source;
   receiving light transmitter from said source;
   producing an electrical signal related to the intensity of said received light; and
   detecting at least one extremum in said signal, said at least one extremum occurring when said fluid boundary is positioned proximate the beam of light received in said receiving step.

21. A method of detecting a relative change in the position of a fluid boundary comprising the steps of:
   transmitting light from a constant source;
   receiving light transmitted from said source;
   producing an electrical signal related to the intensity of said received light; and
   detecting at least one extremum in said signal, said at least one extremum occurring when said fluid boundary is positioned proximate the beam of light received in said receiving step.

22. Apparatus for sensing with respect to a fluid boundary comprising:
   a light source of constant intensity;
   means for receiving light from said source;
   means, responsive to said receiving means, for producing an electrical signal related to the intensity of said received light;
   means for detecting a maxima in said signal occurring when said fluid boundary is positioned proximate the beam of light received by said receiving means.

23. Apparatus for detecting a change in the position of a fluid boundary relative to a fixed position comprising:
   a light source of constant intensity;
   means for receiving light from said source;
   means responsive to said receiving means, for producing an electrical signal related to the intensity of the received light;
   means for detecting at least one extremum in said signal occurring when said fluid boundary is positioned proximate the beam of light received by said receiving means.

* * * * *